I. L. BAKER.
Molds for Sealing-Wax.

No. 143,866. Patented Oct. 21, 1873.

UNITED STATES PATENT OFFICE.

ISAAC L. BAKER, OF DAYTON, OHIO.

IMPROVEMENT IN MOLDS FOR SEALING-WAX.

Specification forming part of Letters Patent No. 143,866, dated October 21, 1873; application filed April 11, 1873.

*To all whom it may concern:*

Be it known that I, ISAAC L. BAKER, of Dayton, in the county of Montgomery and State of Ohio, have invented an Improved Mold for Sealing-Wax, of which the following is a specification:

My invention relates to a mold so constructed that the upper edges of the sealing-wax congeal first, thereby producing rounded edges to the cake, instead of angular ones.

Figure 1:
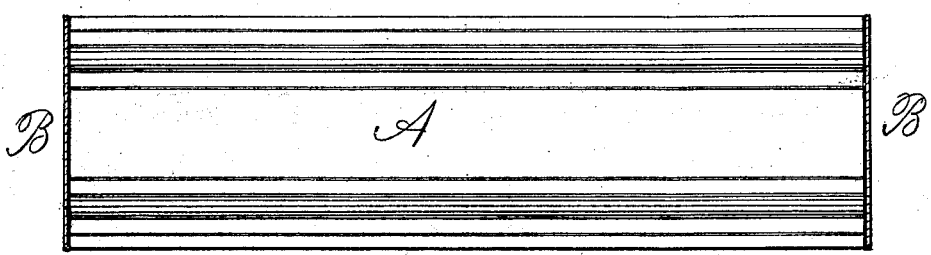
Figure 2:
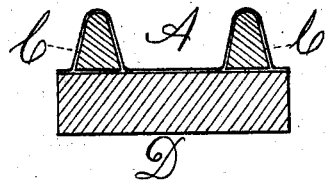

Figure 1 is a top view of the mold. Fig. 2 is a transverse section of the same.

A represents a thin metallic plate, formed as shown in cross-section, Fig. 2, and preferably made of tin plate. C C are cast-iron pieces, which fill the grooves within the plate. These may be securely soldered in position, or secured in a manner that they may be readily removed. D is a block which supports the mold and the metallic end pieces B, which serve to close up the ends of the mold.

In the practical use of my invention I use a frame large enough to contain a series of the molds, two sides of which are lined with metallic plates corresponding with plates B.

The operation may be described thus: The separate molds are first placed into a common frame. Into the molds is poured the molten sealing-wax, and, the congealing-bars conducting the caloric most rapidly from the sides, the top of the cake is formed with beautifully-rounded edges.

What I claim as my invention is—

The grooved metallic plate A and congealing-bars C, constructed and arranged substantially as described, and for the purpose set forth.

ISAAC L. BAKER.

Witnesses:
    B. PICKERING,
    J. B. SENICE.